US008441507B2

(12) United States Patent
Yamaguchi et al.

(10) Patent No.: US 8,441,507 B2
(45) Date of Patent: May 14, 2013

(54) EXPOSURE DEVICE, IMAGE FORMING APPARATUS, AND IMAGE FORMING UNIT

(75) Inventors: Yoshinori Yamaguchi, Kanagawa (JP); Hirohito Yoneyama, Kanagawa (JP); Yohei Nishino, Kanagawa (JP); Takashi Matsumura, Kanagawa (JP); Kiyokazu Mashimo, Kanagawa (JP); Katsuhiro Sato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 270 days.

(21) Appl. No.: 12/880,525

(22) Filed: Sep. 13, 2010

(65) Prior Publication Data

US 2011/0234738 A1 Sep. 29, 2011

(30) Foreign Application Priority Data

Mar. 25, 2010 (JP) ................................ 2010-070970
Jun. 24, 2010 (JP) ................................ 2010-144105

(51) Int. Cl.
*G01D 15/06* (2006.01)

(52) U.S. Cl.
USPC .......................................................... 347/160

(58) Field of Classification Search .................. 347/160
See application file for complete search history.

(56) References Cited

FOREIGN PATENT DOCUMENTS

JP 2007083638 A * 4/2007
JP A-2007-083637 4/2007
JP A-2007-083638 4/2007

* cited by examiner

*Primary Examiner* — Stephen Meier
*Assistant Examiner* — Tracey McMillion
(74) *Attorney, Agent, or Firm* — Oliff & Berridge, PLC

(57) ABSTRACT

The present invention provides an annular exposure device, including:

plural light emitting members that are provided two-dimensionally along an outer circumferential surface of the annular exposure device, the annular exposure device rotating when the annular exposure device contacts a surface of an image holding member.

5 Claims, 16 Drawing Sheets

EXPOSURE DEVICE, IMAGE FORMING APPARATUS, AND IMAGE FORMING UNIT

CROSS-REFERENCE TO RELATED APPLICATION

This application is based on and claims priority under 35 USC 119 from Japanese Patent Application No. 2010-070970 filed on Mar. 25, 2010 and Japanese Patent Application No. 2010-144105 filed on Jun. 24, 2010.

BACKGROUND

1. Technical Field

The present invention relates to an exposure device, an image forming apparatus, and an image forming unit.

2. Related Art

An electrophotographic image forming apparatus emits light to a charged image holding member to form an electrostatic latent image, develops the electrostatic latent image with a developer including toner to form a toner image, and transfers the toner image onto an object, such as a recording medium, thereby forming an image.

SUMMARY

According to an aspect of the invention, there is provided annular exposure device including plural of light emitting members that are provided two-dimensionally along an outer circumferential surface of the annular exposure device, the annular exposure device rotating when the annular exposure device contacts a surface of an image holding member.

BRIEF DESCRIPTION OF THE DRAWINGS

Exemplary embodiments of the invention will be described in detail based on the following figures, wherein.

DETAILED DESCRIPTION OF THE INVENTION

Hereinafter, exemplary embodiments of the present invention will be described.

First Exemplary Embodiment

Figure 1:
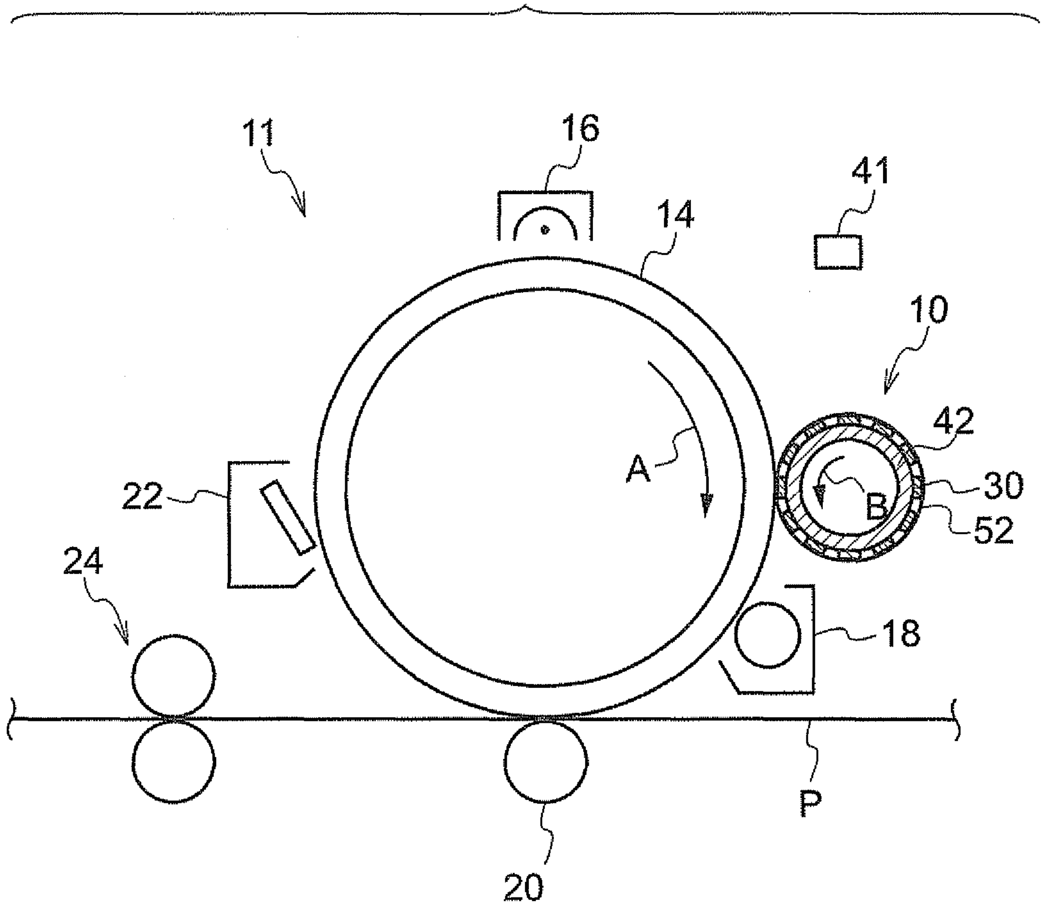
FIG. 1 is a diagram schematically illustrating an example of the structure of an image forming apparatus and an exposure device according to an exemplary embodiment.

FIG. 1 shows an example of an exposure device according to this exemplary embodiment and an example of an image forming apparatus including the exposure device according to this exemplary embodiment.

As shown in FIG. 1, an image forming apparatus 12 according to this exemplary embodiment includes an image holding member 14, a charging device 16, an exposure device 10, a developing device 18, a transfer device 20, a removing device 22, a fixing device 24, and a control device 41 that controls each unit of the image forming apparatus 12.

The image holding member 14 is rotated in the circumferential direction thereof (in FIG. 1, the direction of an arrow A) by a driving mechanism (not shown). The charging device 16 charges the image holding member 14. The exposure device 10 emits exposure light corresponding to an image to be formed to the image holding member 14 which has been charged by the charging device 16, thereby forming an electrostatic latent image corresponding to the image on the image holding member 14. The developing device 18 develops the electrostatic latent image formed on the image holding member 14 by the exposure operation of the exposure device 10 with a developer including toner, thereby forming a toner image corresponding to the electrostatic latent image. The toner image formed on the image holding member 14 is transferred onto a recording medium P by the transfer device 20 and is then fixed to the recording medium P by the fixing device 24. Materials adhered to the image holding member 14, such as toner or paper powder, are removed by the removing device 22. The control device 41 is electrically connected to each unit of the image forming apparatus 12. According to the control by the control device 41, each unit of the image forming apparatus 12 drives to form an image.

Known devices used in electrophotographic image forming apparatuses may be used as the image holding member 14, the exposure device 10, the developing device 18, the transfer device 20, the removing device 22, and the fixing device 24.

The image holding member 14, the charging device 16, the exposure device 10, the developing device 18, and the removing device 22 may be integrated into an image forming unit 11. The image forming unit 11 is constituted as a process cartridge that is attachable to and detachable from the body of the image forming apparatus 12 and is replaceable. The image fowling unit 11 may include at least the exposure device 10 and at least one of the image holding member 14, the charging device 16, the developing device 18, and the removing device 22. The invention is not limited to the structure in which the image forming unit 11 includes all of the image holding member 14, the charging device 16, the exposure device 10, the developing device 18, and the removing device 22. The image forming unit 11 may include, for example, at least one of the image holding member 14, the charging device 16, and the developing device 18, and the exposure device 10.

Figure 2:
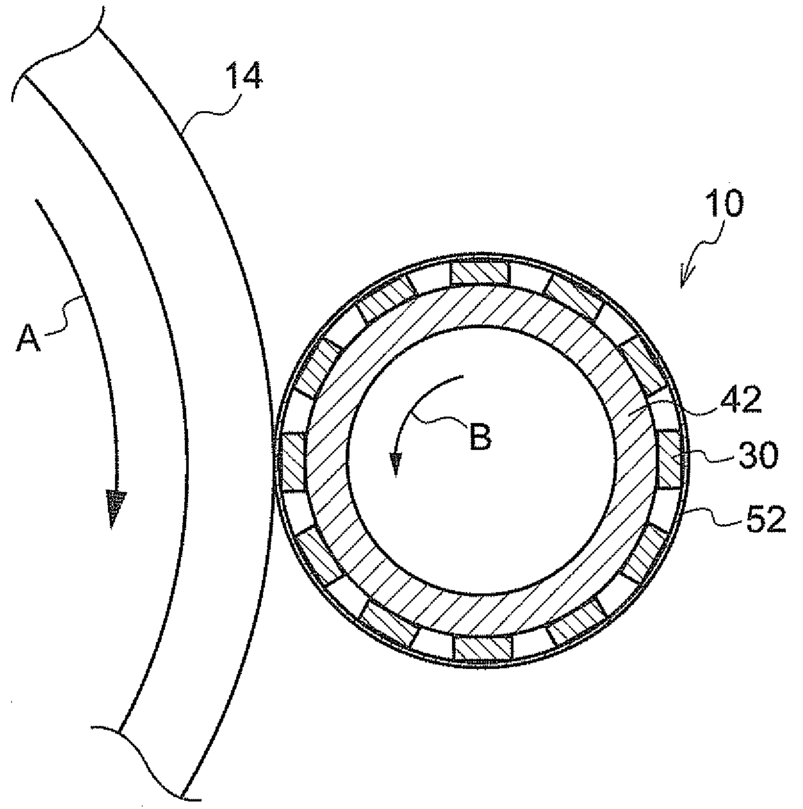
FIG. 2 is an enlarged view schematically illustrating a contact portion between the exposure device and an image holding member of the image forming apparatus according to an exemplary embodiment.
Figure 3:
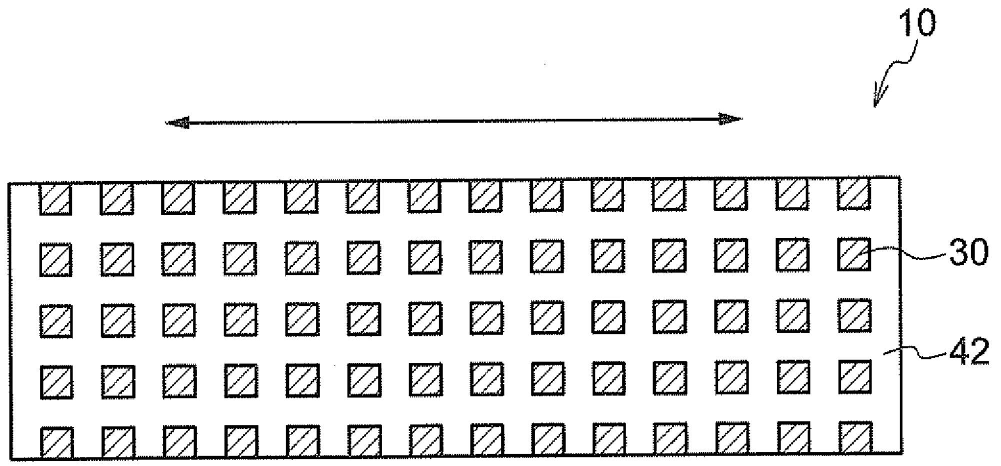
FIG. 3 is a diagram schematically illustrating an example of the structure of the exposure device according to an exemplary embodiment.

The exposure device 10 has an annular shape and is arranged such that the exposure device 10 rotates when the outer circumferential surface of the exposure device contacts a surface of the image holding member 14 (see FIGS. 1 and 2). The exposure device 10 includes plural light emitting members 30 that are provided two-dimensionally along the outer circumferential surface of the exposure device (see FIGS. 1 to 3). The exposure device 10 rotates in contact with the surface of the image holding member 14, whereby exposure light is emitted from each of the plural light emitting members 30 provided in the exposure device 10 to the image holding member 14 and an electrostatic latent image is formed on the image holding member 14.

Each of the plural light emitting members 30 provided in the exposure device 10 emits exposure light for forming an electrostatic latent image on the image holding member 14 that has been charged by the charging device 16. The light emitting members 30 may be arranged two-dimensionally along the outer circumferential surface of the image holding member 14. It is preferable that the light emitting members 30 are arranged at positions corresponding to each pixel of the electrostatic latent image to be formed. Specifically, each of plural light emitting members 30 may be arranged so as to correspond to one pixel, plural light emitting members 30 may be arranged so as to correspond to one pixel, or one light emitting member 30 may be arranged so as to correspond to plural pixels. In particular, it is preferable that one light emitting member 30 or plural light emitting members 30 are arranged so as to correspond to one pixel in view of further improving the resolution of the electrostatic latent image.

The light emitting members 30 may be used as long as they emit exposure light for forming an electrostatic latent image on the image holding member 14. For example, an organic electro-luminescent element (hereinafter, referred to as an organic EL element) or a light emitting diode (LED) is given as an example of the light emitting member 30.

Figure 4A:
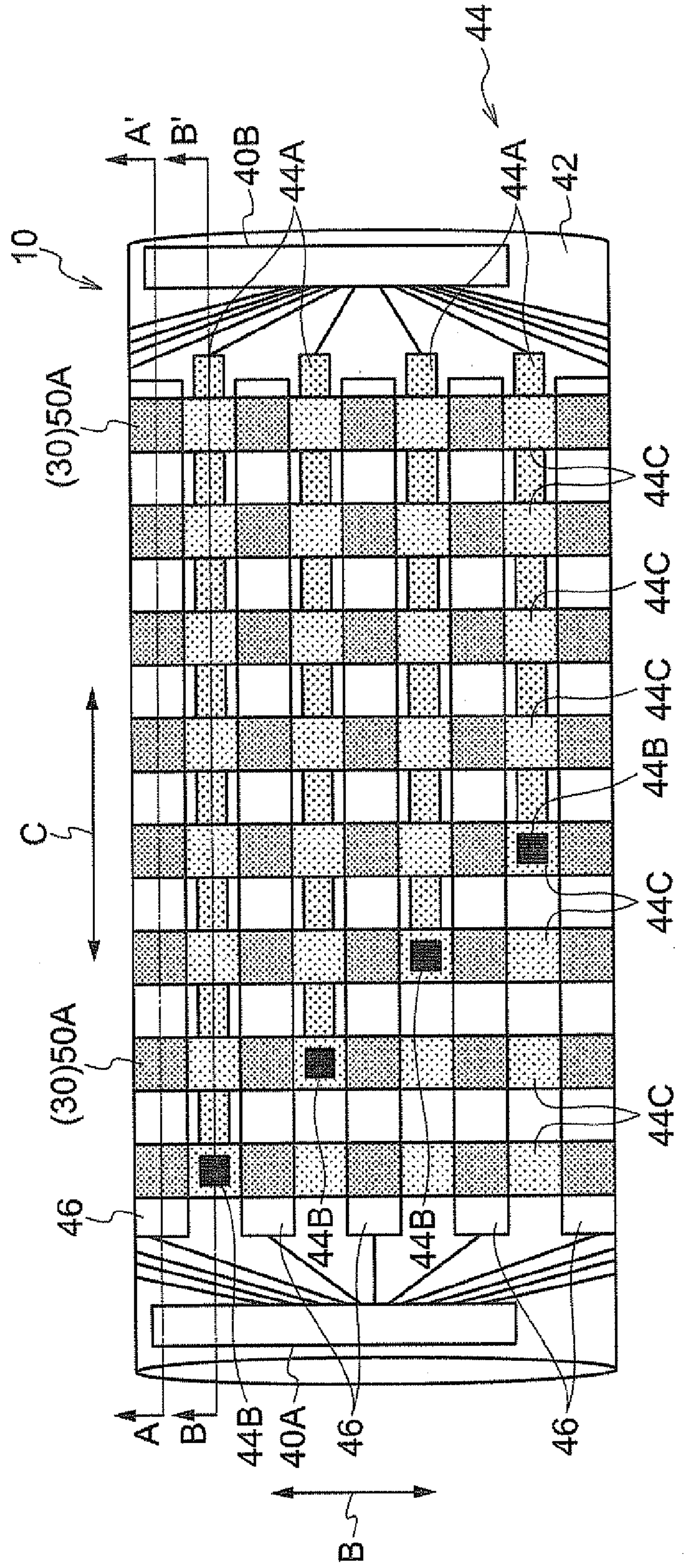
FIG. 4A is a diagram schematically illustrating an example of the structure of the exposure device according to an exemplary embodiment.
Figure 4B:
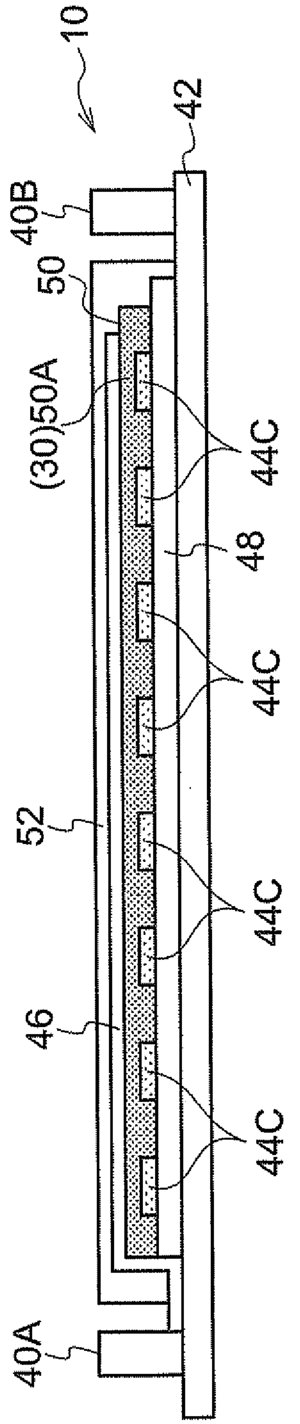
FIG. 4B is a cross-sectional view taken along the line A-A' of FIG. 4A.
Figure 4C:
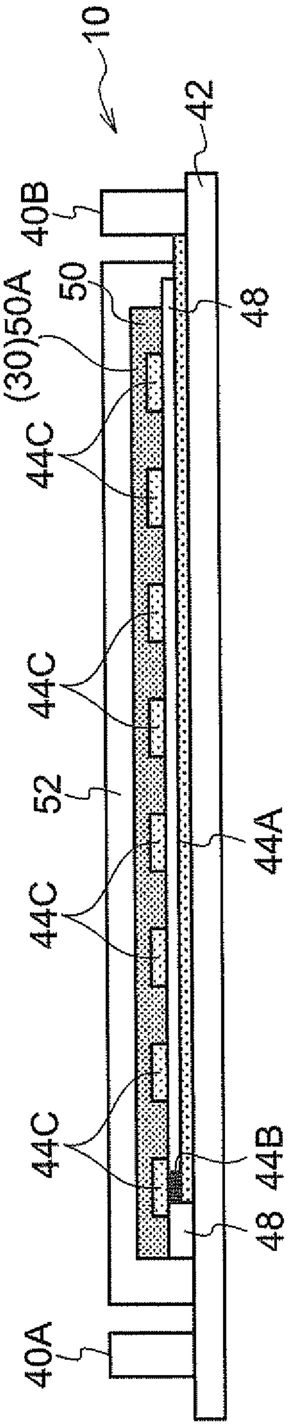
FIG. 4C is a cross-sectional view taken along the line B-B' of FIG. 4A.

In the case that the organic EL element is used as the light emitting member 30, the structure shown in FIGS. 4A to 4C is given as an example of the structure of the exposure device 10.

As shown in FIGS. 4A to 4C, the exposure device 10 includes an annular support 42. In this exemplary embodiment, the support 42 is exemplified as a non-deforming hard member (see FIG. 5A). However, the invention is not limited to the member. The other structures will be described in detail in a second exemplary embodiment.

As shown in FIGS. 4A to 4C, plural strip-shaped first lower electrodes 44A that are elongated in the width direction (rotation axis direction; see the direction of an arrow C in FIG. 4A) of the support 42, are arranged on the support 42 at predetermined intervals in the circumferential direction (in FIG. 4A and FIG. 1, the direction of an arrow B) of the support 42 (see FIG. 4A). An insulating layer 48 is provided on the support 42 on which the plural first lower electrodes 44A have been provided, so that the insulating layer 48 covers the first lower electrodes 44A (see FIG. 4C). Then, plural second lower electrodes 44C having an annular shape are provided on the insulating layer 48 along the circumferential direction of the support 42 at predetermined intervals in the width direction of the support 42.

Each of the plural first lower electrodes 44A extends from one end to the other end of the support 42 in the width direction thereof and reaches the position where each of the plural first lower electrodes 44A is in one-to-one correspondence with each of the plural second lower electrodes 44C. One end of each of the plural first lower electrodes 44A which extends up to the position of the corresponding second lower electrode 44C is electrically connected to the corresponding second lower electrode 44C through a via 44B (conductive portion) provided in the insulating layer 48 (see FIGS. 4A and 4C). Therefore, the first lower electrode 44A, the via 44B, and the second lower electrode 44C are electrically connected to each other. The first lower electrode 44A, the via 44B, and the second lower electrode 44C function as plural lower electrodes 44 that apply a voltage from the side of the support 42 to an organic EL layer 50, which will be described below.

As described above, the plural first lower electrodes 44A are arranged at intervals in the circumferential direction of the support 42 and the plural second lower electrodes 44C are arranged at intervals in the width direction of the support 42. Therefore, the plural first lower electrodes 44A and the plural second lower electrodes 44C are arranged so as to intersect each other. However, it is preferable that the plural first lower electrodes 44A and the plural second lower electrodes 44C are arranged so as to be orthogonal to each other.

In each of the plural first lower electrodes 44A, one end opposite to the other end which is connected to the via 44B in the width direction of the support 42 is electrically connected to a driving unit 40B provided on the support 42. The driving unit 40B is electrically connected to the control device 41. Therefore, when a voltage is applied from the driving unit 40B to each of the plural first lower electrodes 44A, the voltage is applied to the corresponding second lower electrode 44C through the via 44B. In this way, the voltage is applied to each of the plural lower electrodes 44.

The organic EL layer 50 is formed on the second lower electrodes 44C. Specifically, the organic EL layer 50 is provided on the insulating layer 48 so as to cover the plural second lower electrodes 44C that have been provided on the insulating layer 48. The organic EL layer 50 may be made of a known organic EL material.

Among the layers or members forming the exposure device 10, layers or members those are provided closer to the image holding member 14 (that is, the outer circumferential side) than to the organic EL layer 50 (light emitting member 30) transmits exposure light emitted from the organic EL layer 50 (transmittance is 30% or more, preferably, 80% or more).

Plural upper electrodes 46 are provided on the organic EL layer 50. The plural upper electrodes 46 have a strip shape elongated in the width direction (rotation axis direction) of the support 42 and are arranged at intervals in the circumferential direction of the support 42. As described above, the upper electrodes 46 transmit light emitted from the organic EL layer 50. For example, the upper electrode 46 has a structure in which a transparent conductive layer made of transparent aluminum or ITO, which is a representative example of a transparent material, is provided on a charge injection layer including, for example, calcium. In this exemplary embodiment, "conduction" refers that volume resistivity is $10^{-4}$ Ωcm or less.

One end of each of the plural upper electrodes 46 in the width direction of the support 42 is electrically connected to a driving unit 40A provided on the support 42 (see FIGS. 4A and 4B). Therefore, a voltage is applied from the driving unit 40A to each of the plural upper electrodes 46.

Since the driving unit 40A and the driving unit 40B are formed of thin film transistors, the driving units 40A and 40B may be thin and flexible.

The other ends of the plural upper electrodes 46 in the width direction of the support 42 extend to the positions where they overlap (intersect) all of the plural second lower electrodes 44C that are arranged at intervals in the width direction of the support 42 (see FIG. 4A). Therefore, each region of the organic EL layer 50 interposed between the upper electrode 46 and the second lower electrode 44C, that is, each region 50A of the organic EL layer 50 corresponding to an intersection of the upper electrode 46 and the second lower electrode 44C functions as the light emitting member 30.

The plural upper electrodes 46 and the plural second lower electrodes 44C may be arranged so as to intersect each other. It is preferable that the plural upper electrodes 46 and the plural second lower electrodes 44C may be arranged so as to be orthogonal to each other from viewpoint of further improving resolution.

The driving unit 40B electrically connected to the plural lower electrodes 44 (first lower electrodes 44A) is constituted such that it selectively applies a voltage to any one or some of the plural lower electrodes 44 (first lower electrodes 44A).

The driving unit 40A electrically connected to the plural upper electrodes 46 is constituted such that it selectively applies a voltage to any one or some of the plural upper electrodes 46.

Therefore, according to the electrostatic latent image to be formed, when the driving unit 40A selectively applies a voltage to any one of the plural upper electrodes 46 and the driving unit 40B selectively applies a voltage to any one of the plural lower electrodes 44 (first lower electrodes 44A), light is emitted from the region 50A (light emitting member 30) of the entire organic EL layer 50 corresponding to each pixel of the electrostatic latent image to be formed, and the image holding member 14 is exposed by the light. The driving unit 40A and the driving unit 40B may be controlled by the control device 41 electrically connected to the driving unit 40A and the driving unit 40B. In this exemplary embodiment, the driving unit 40A and the driving unit 40B are controlled by the control device 41 that controls the image forming apparatus 12, but the invention is not limited thereto. A control device (not shown) may be separately provided in the exposure device 10 so as to be electrically connected to the driving unit 40A and the driving unit 40B and control the driving unit 40A and the driving unit 40B.

When the exposure device 10 is formed in the above-mentioned multi-layer wiring structure, it is easy to adjust the distance between the electrodes, particularly, it is easy to reduce the distance between the electrodes (in this exemplary embodiment, between the upper electrodes 46 and between the first lower electrodes 44A) in the circumferential direction. Therefore, it is possible to further improve the resolution of the electrostatic latent image. In addition, when the exposure device 10 is formed in the multi-layer wiring structure using the organic EL layer 50, it is easy to reduce the distance between the light emitting members 30 (that is, the organic EL layer 50 and the regions 50A) and the image holding member 14. Therefore, it is possible to further improve the resolution.

It is preferable to provide a surface layer 52 as the outermost layer contacting the image holding member 14 on the outer circumferential surface (in this exemplary embodiment, on the upper electrode 46) of the exposure device 10.

The surface layer 52 has transparency, elastic, and insulating property. The term "transparency" refers to a property that transmits exposure light emitted from the light emitting member 30 (transmittance is 30% or more, preferably, 80% or more). For the "elasticity", when the exposure device 10 is arranged so as to come into contact with the surface of the image holding member 14, thereby being deformed, and the deform of the surface has sufficient elasticity not to affect the emission characteristics of the light emitting member 30. The term "insulating property" refers that volume resistivity is $10^{13}$ Ωcm or more.

Examples of materials of the surface layer 52 may include a fluorine-based resin, such as PTFE (polytetrafluoroethylene), PFA (ethylene fluoride-perfluoroalkoxyethylene copolymer), and FEP (tetrafluoroethylene-hexafluoropropylene copolymer); a silicone resin, fluoro-rubber, and silicone rubber. The surface layer 52 may be formed by applying the liquid or dispersion liquid of the above-mentioned material on the surface or coating a tube of the above-mentioned material.

It is preferable that the thickness of the surface layer 52 is less than that of the image holding member 14 from viewpoint of preventing a reduction in the emission efficiency of the light emitting member 30. The thickness of the surface layer 52 less than that of the image holding member 14 refers that the thickness of at least a region of the entire surface layer 52 that contacts at least the image holding member 14 is less than that of the image holding member 14.

Next, the operation of the exposure device 10 according to this exemplary embodiment will be described.

Figure 5A:
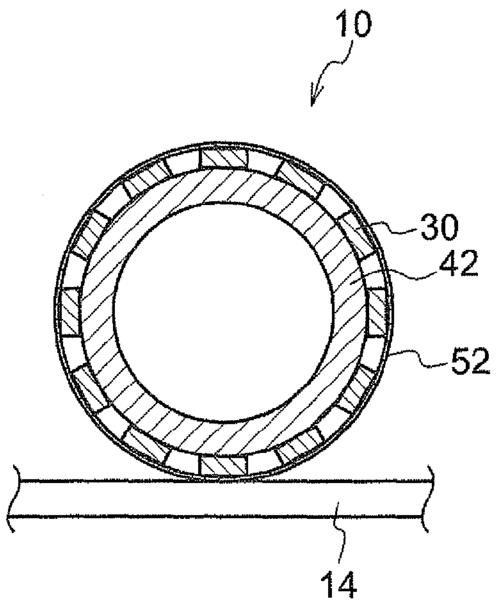
FIG. 5A is a diagram schematically illustrating an example of the exposure device according to an exemplary embodiment.

In this exemplary embodiment, as described above, the support 42 of the exposure device 10 is constituted with a non-deforming hard member (see FIG. 5A). Therefore, in this exemplary embodiment, the exposure device 10 including the support 42 is arranged so as to be pressed by a pressing member (not shown) in a direction such that a rotating shaft (not shown) of the exposure device 10 comes close to the surface of the image holding member 14, whereby the exposure device 10 contacting the surface of the image holding member 14.

In the case that the exposure device 10 is configured as shown in FIG. 4, when the image holding member 14 rotates according to the control by the control device 41, the exposure device 10 arranged so as to contact the outer circumferential surface of the image holding member 14 rotates due to the rotation of the image holding member 14.

The exposure timing of the image holding member by each light emitting member 30 provided in the exposure device 10 is not limited to the above-mentioned timing. For example, the light emitting members 30 provided at the positions corresponding to each pixel of the electrostatic latent image to be formed among the plural light emitting members 30 in the exposure device 10 may be controlled to emit light only when they reach a contact region with the image holding member 14. In this case, the control device 41 may control the driving unit 40A and the driving unit 40B according to the rotational speed of the image holding member 14, the rotational speed of the exposure device 10, and an image (electrostatic latent image) to be formed. In addition, a speed sensor may be provided in the image forming apparatus 12 in order to measure the rotational speeds of the image holding member 14 and the exposure device 10, or the rotational speeds of the image holding member 14 and the exposure device 10 may be calculated on the basis of signals input from a driving unit (not shown) that rotary drives the image holding member 14.

When exposure light is emitted from each of the light emitting members 30 to the image holding member 14, an electrostatic latent image is formed in the region where the image holding member 14, that has been charged by the charging device 16, comes into contact with the exposure device 10. The exposure timing of each of the plural light emitting members 30 provided in the exposure device 10 may be controlled as follows. For example, a control process may be performed by repeating a process in which light emitting members 30 at the positions corresponding to each pixel of the electrostatic latent image to be formed are controlled to emit light from before the light emitting members 30 reach the contact region with the image holding member 14, and after the light emitting members 30 pass the contact region, exposure is changed over so that the next object light emitting member 30 emits light. The control device 41 may control the driving unit 40A and the driving unit 40B to perform the process.

By the above-mentioned control process, exposure light is emitted from each of the light emitting members 30 of the exposure device 10 to the image holding member 14 to form an electrostatic latent image in a contact region with the exposure device 10 in the image holding member 14.

As described above, the exposure device 10 according to this exemplary embodiment is constituted as an annular device that includes plural light emitting members that are provided two-dimensionally along the outer circumferential surface of the annular exposure device, and the annular exposure device rotates when the annular exposure device contacts the surface of the image holding member 14. An electrostatic latent image is formed on the image holding member 14 by the exposure device 10. Therefore, the resolution of the electrostatic latent image formed on the image holding member 14 can be improved. As a result, a high-resolution image can be formed. It is considered that this is because the distance between the light emitting member 30 and the surface of the image holding member 14 is shorter than that in the related art in which light is emitted from the inside of the image holding member 14. In addition, it may be easy to manufacture the exposure device 10 according to this exemplary embodiment, in comparison with the related art in which light is emitted from the inside of the image holding member 14.

The exposure device 10 according to this exemplary embodiment emits light to the image holding member 14 without using the Selfoc lens, unlike the related art in which exposure is performed through the Selfoc lens. Therefore, it is presumed that it is possible to improve the usage efficiency of light emitted from the light emitting member 30.

In addition, it is possible to reduce the size of the exposure device 10 according to this exemplary embodiment, in comparison with the related art in which light is emitted from a light source to the image holding member 14 through, for example, a polygon mirror that performs scanning exposure to the image holding member 14.

In this exemplary embodiment, since the support 42 of the exposure device 10 is formed with a non-deforming hard member, it is possible to prevent the distortion of the exposure device 10 and improve the positional accuracy of the electrostatic latent image formed on the image holding member 14.

In the above-described exemplary embodiment, the case in which the exposure device 10 rotates due to the rotation of the image holding member 14 is explained. Alternatively, a driving device may be provided separately from the image holding member 14 and the exposure device 10 may be driven to rotate separately from the image holding member 14. It is presumed that the exposure device 10, which is constituted so as to rotate due to the rotation of the image holding member 14, suppresses abrasion of the image holding member 14 more effectively. In addition, since it is not necessary to provide a separate rotating mechanism for the exposure device 10, it is possible to reduce the size of an apparatus.

In this exemplary embodiment, the case in which the exposure device 10 is fixed to the image forming apparatus 12 is explained. However, the exposure device 10 may be configured so as to be removable from the body of the image forming apparatus 12. In this case, when the exposure device 10 is provided in the image forming apparatus 12, the exposure device 10 may be connected to each unit of the image forming apparatus 12 and the driving unit 40A and the driving unit 40B may be electrically connected to the control device 41 of the image forming apparatus 12.

In this exemplary embodiment, the case in which an organic EL element is used as the light emitting member 30 of the exposure device 10 is explained. However, an LED may be used as the light emitting member 30. In this case, similarly, LEDs may be provided as the light emitting members 30 on the support 42 at positions corresponding to each pixel of an image to be formed and a driving device supplying power to each of the LEDs may be provided in the exposure device 10 (not shown). The driving device may be electrically connected to the control device 41 of the image forming apparatus 12 and the control device 41 controls the driving device to supply power to the LEDs to emit light.

Similarly, when an LED is used as the light emitting member 30, it is preferable that the surface layer 52 is provided on the outer circumferential side of the exposure device 10.

The structure of the image forming apparatus 12 according to this exemplary embodiment is not limited to the above. For example, the invention may be applied to an intermediate-transfer-type image forming apparatus using an intermediate transfer body and a so-called tandem image forming apparatus in which image forming units for forming each color toner image are arranged in parallel.

Second Exemplary Embodiment

In the first exemplary embodiment, the case in which the support 42 of the exposure device 10 is a non-deforming hard member is explained (see FIG. 5A). However, the support 42 may be a film-shaped flexible support.

Figure 5B:
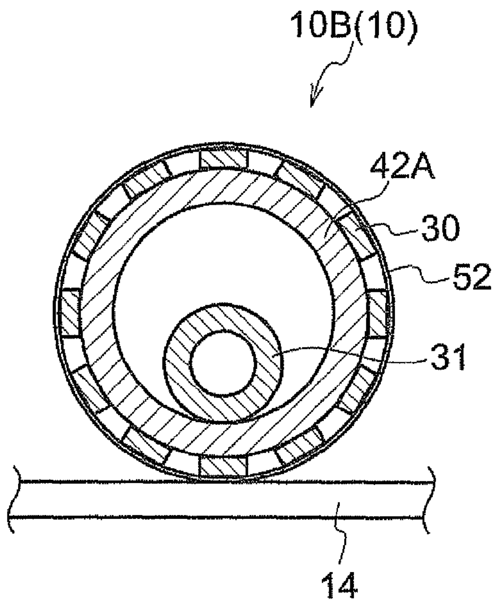
FIG. 5B is a diagram schematically illustrating another example of the exposure device according to an exemplary embodiment, which is different from that shown in FIG. 5A.

Specifically, as shown in FIG. 5B, an exposure device 10B using a film-shaped flexible support 42A may be provided. The other layer structures are the same as those of the exposure device 10 and thus a description thereof will be omitted.

In this case, for example, a columnar or cylindrical supporting member 31 may be provided inside the exposure device 10B and the exposure device 10B may be constituted to contact the surface of the image holding member 14 through the supporting member 31. The surface of the supporting member 31 may be made of a non-deforming hard member or an elastic material. The supporting member 31 may be a pad with a shape corresponding to the outer circumferential surface of the image holding member 14. Even in the case that the supporting member 31 is a pad, the surface of the pad may be made of a non-deforming hard member or an elastic material.

According to the above-mentioned structure, compared to the case in which support 42 is made of a non-deforming hard member (exposure device 10; see FIG. 5A), although the positional accuracy of the electrostatic latent image formed on the image holding member 14 may be reduced, it is possible to improve the resolution of the electrostatic latent image and reduce the size of an apparatus, in comparison with the related art.

Figure 5C:
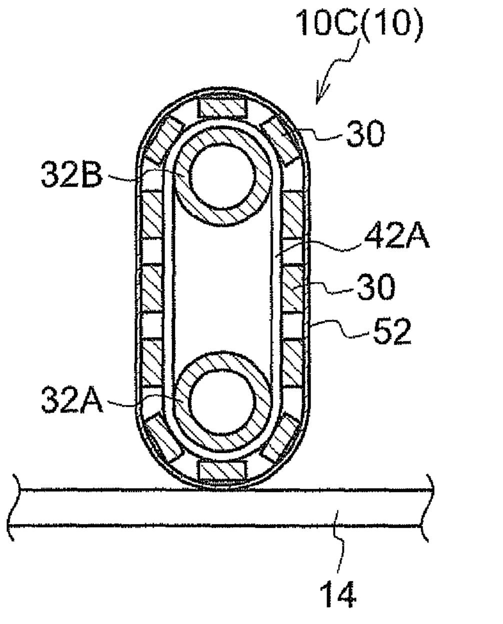
FIG. 5C is a diagram schematically illustrating still another example of the exposure device according to an exemplary embodiment, which is different from those shown in FIGS. 5A and 5B.

When the support 42 is a flexible film, an exposure device 10C having two supporting members 32B and 32A arranged therein may be provided, as shown in FIG. 5C. In this case, the exposure device 10C may be constituted to contact the surface of the image holding member 14 through only the supporting member 32A. According to this structure, compared to the case in which support 42 is made of a non-deforming hard member (exposure device 10; see FIG. 5A), although the positional accuracy of the electrostatic latent image formed on the image holding member 14 may be reduced, it is possible to improve the resolution of the electrostatic latent image and reduce the size of an apparatus, in comparison with the related art.

Figure 5D:
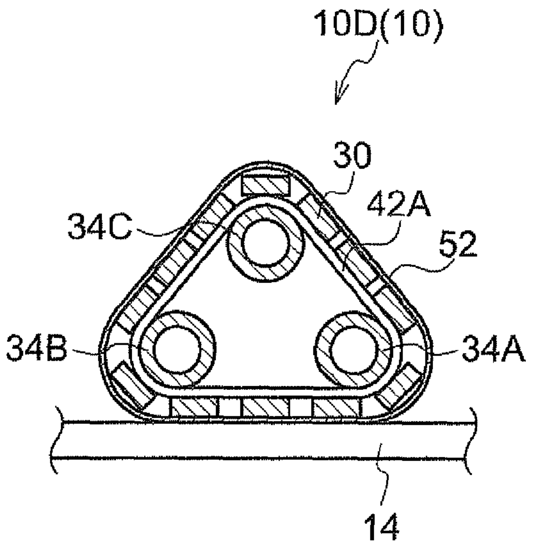
FIG. 5D is a diagram schematically illustrating yet another example of the exposure device according to an exemplary embodiment, which is different from those shown in FIGS. 5A to 5C.

When the support 42 is a flexible film, an exposure device 10D having plural supporting members arranged therein may be provided, as shown in FIG. 5D. For example, as shown in FIG. 5D, the exposure device 10D having three supporting members 34A, 34B, and 34C arranged therein may be provided. In this case, for example, the exposure device 10D may be constituted such that an area of the outer circumferential surface of the exposure device 10D is followed the shape of the outer circumferential surface of the image holding member 14 by two supporting members (for example, the supporting member 34B and the supporting member 34A) among the three supporting members. According to this structure, it is possible to improve the positional accuracy of the electrostatic latent image formed on the image holding member 14. In addition, it is possible to improve the resolution of the electrostatic latent image, in comparison with the related art.

In this exemplary embodiment, the case in which the elemental structure of the exposure device 10 is a top emission type is explained. However, the exposure device 10 according to this exemplary embodiment is not limited to the above-mentioned elemental structure, but it may be a bottom emission type.

Third Exemplary Embodiment

In this exemplary embodiment, the connection relationship between the driving unit 40A and the driving unit 40B of the exposure device, and the control device 41 of the image forming apparatus will be described in detail.

Figure 6:
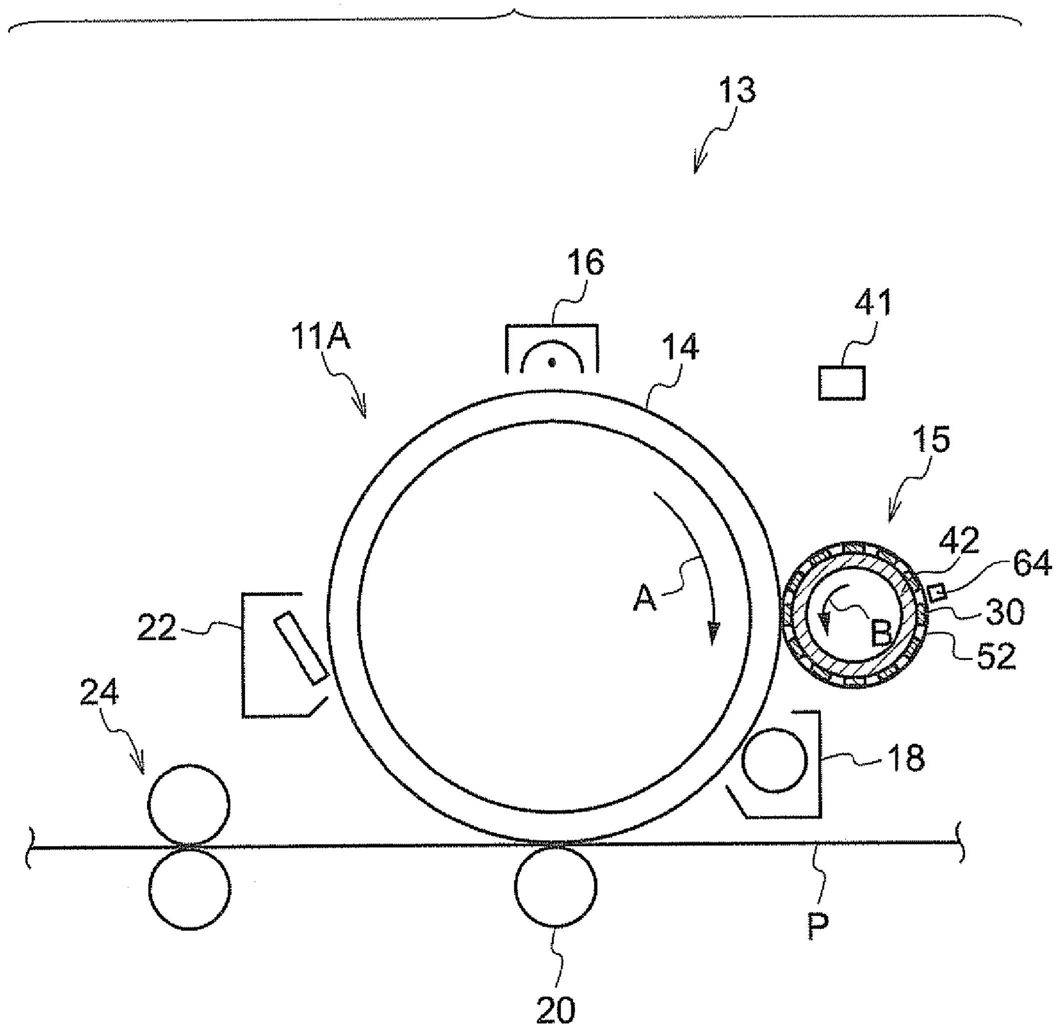
FIG. 6 is a diagram schematically illustrating an example of the structure of an image forming apparatus and an exposure device according to a third exemplary embodiment.

FIG. 6 shows an example of an exposure device 15 according to this exemplary embodiment and an image forming apparatus 13 including the exposure device 15 according to this exemplary embodiment.

The structure of the image forming apparatus 13 according to this exemplary embodiment is the same as that of the image forming apparatus 12 according to the first exemplary embodiment except that the exposure device 15, which will be described below, is provided instead of the exposure device 10 of the image forming apparatus 12 according to the first exemplary embodiment and a conductive member 64 electrically connecting the control device 41 and the exposure device 15 is provided in the image forming apparatus. Therefore, components having the same functions as those in the first exemplary embodiment are denoted by the same reference numerals and a detailed description thereof will be omitted.

Specifically, as shown in FIG. 6, the image forming apparatus 13 according to this exemplary embodiment includes an image holding member 14, a charging device 16, an exposure device 15, a developing device 18, a transfer device 20, a removing device 22, a fixing device 24, a conductive member 64, and a control device 41 that controls each unit of the image forming apparatus 13. The image holding member 14, the charging device 16, the exposure device 15, the developing device 18, the removing device 22, and the conductive member 64 may be integrated into an image forming unit 11A. The image forming unit 11A may be constituted as a process cartridge that is attachable to and detachable from the body of the image forming apparatus 13 and is replaceable. The image forming unit 11A may include at least the exposure device 15 and at least one of the image holding member 14, the charging device 16, the developing device 18, the removing device 22, and the conductive member 64. The invention is not limited to the structure in which the image forming unit 11A includes all of the image holding member 14, the charging device 16, the exposure device 15, the developing device 18, the removing device 22, and the conductive member 64. The image forming unit 11A may include, for example, at least one of the image holding member 14, the charging device 16, the developing device 18, and the conductive member 64, and the exposure device 15.

Similar to the exposure device 10, the exposure device 15 according to this exemplary embodiment has an annular shape and is arranged such that the exposure device 15 rotates when the outer circumferential surface of the exposure device 15 contacts the surface of the image holding member 14 (see FIG. 6). The exposure device 15 includes plural light emitting members 30 that are provided two-dimensionally along the outer circumferential surface of the exposure device 15 (see FIG. 7). When the exposure device 15 rotates in contact with the surface of the image holding member 14, exposure light is emitted from each of the plural light emitting members 30 provided in the exposure device 15 to the image holding member 14 and an electrostatic latent image is formed on the image holding member 14.

The exposure device 15 according to this exemplary embodiment has the same structure as the exposure device 10 according to the first exemplary embodiment except that it further includes annular electrodes 60 (see FIG. 7), which will be described below, and electrodes 61 (see FIG. 7) (corresponding to electrode regions of the image forming apparatus according to the invention), which will be described below. Therefore, components having the same functions as those in the first exemplary embodiment are denoted by the same reference numerals and a detailed description thereof will be omitted.

Figure 7:
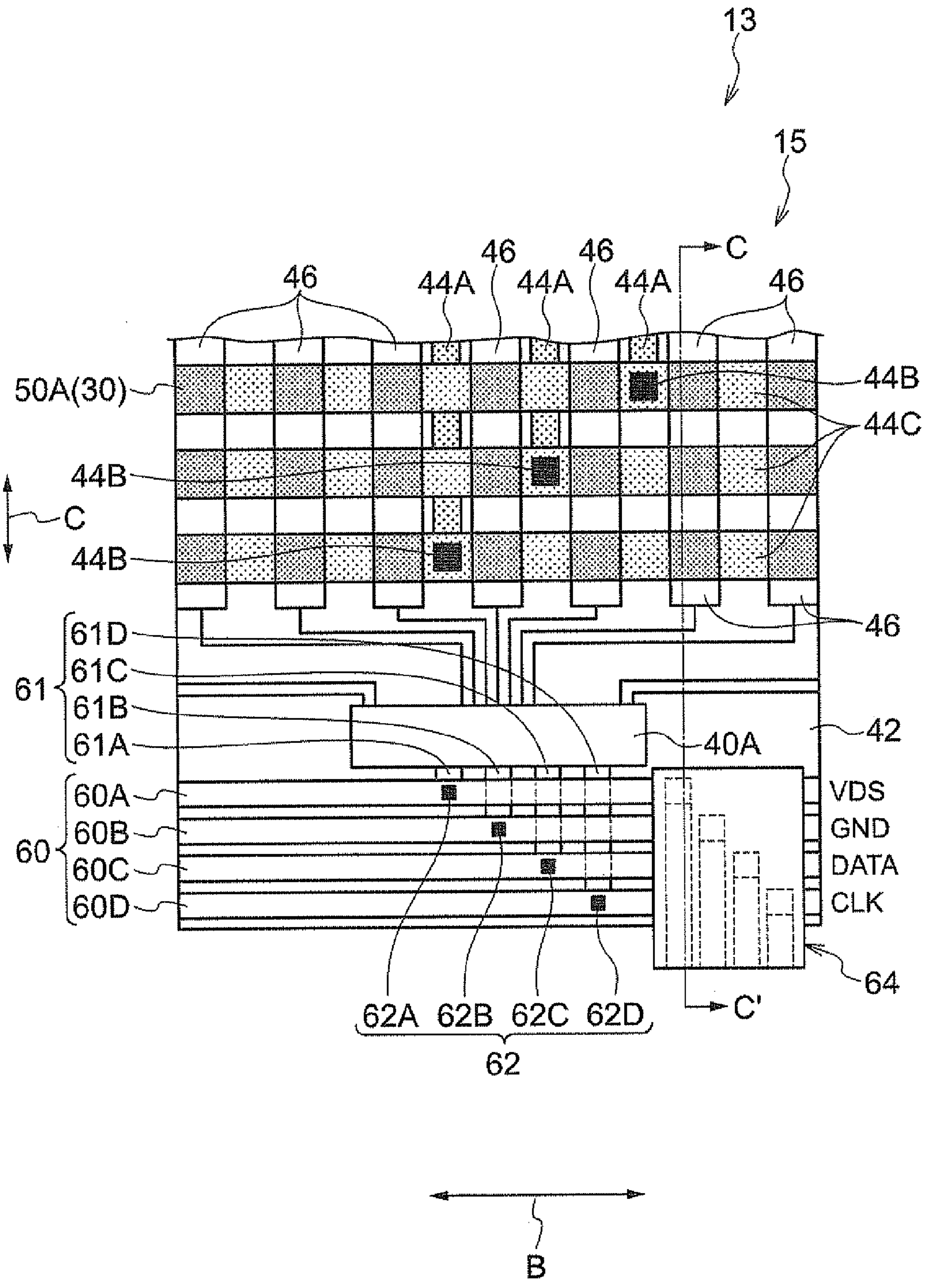
FIG. 7 is an enlarged view schematically illustrating an example of portions of the exposure device and a conductive member of the image forming apparatus according to a third exemplary embodiment.
Figure 10:
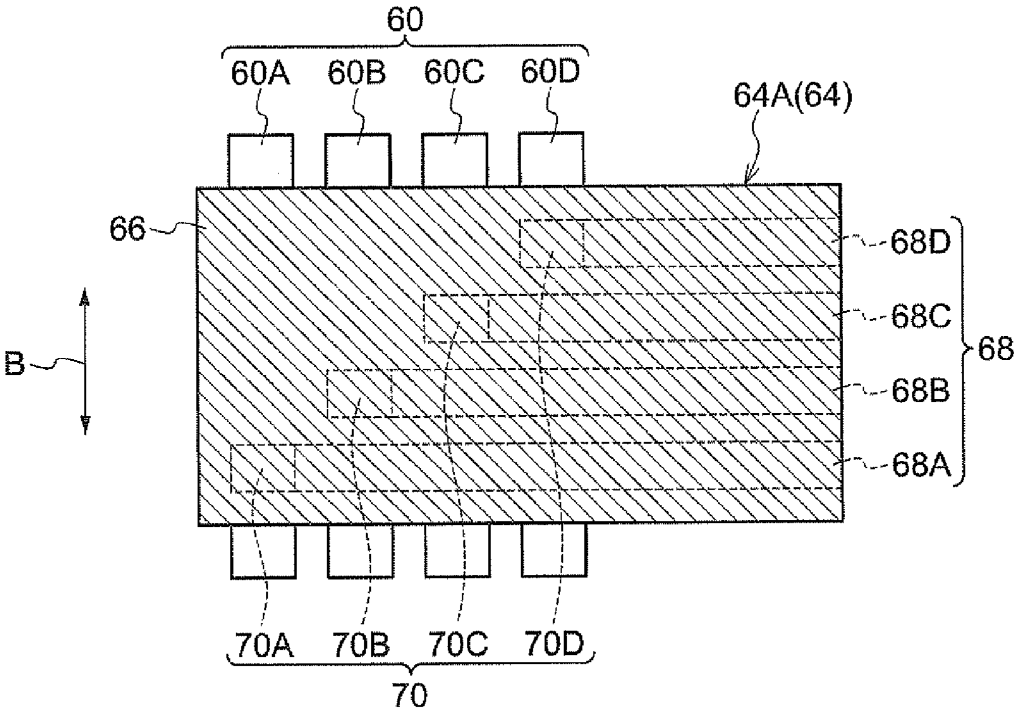
FIG. 10 is a diagram schematically illustrating an example of the conductive member according to a third exemplary embodiment.

That is, as shown in FIGS. 7 and 10, the exposure device 15 includes an annular support 42, similarly to the exposure device 10 according to the first exemplary embodiment. FIGS. 7 and 10 are enlarged views schematically illustrating the structure of only one side of the exposure device 15 in the width direction.

Plural first lower electrodes 44A are arranged on the support 42. An insulating layer 48 is provided on the support 42 having the plural first lower electrodes 44A provided thereon so as to cover the first lower electrodes 44A (see FIG. 8). Plural second lower electrodes 44C having annular shape are formed along the circumferential direction of the support 42, on the insulating layer 48 at intervals in the width direction of the support 42. Each of the plural first lower electrodes 44A is electrically connected to the lower electrode 44C through a via 44B (occasionally referred to as “connected” or “conducted”).

Figure 8:
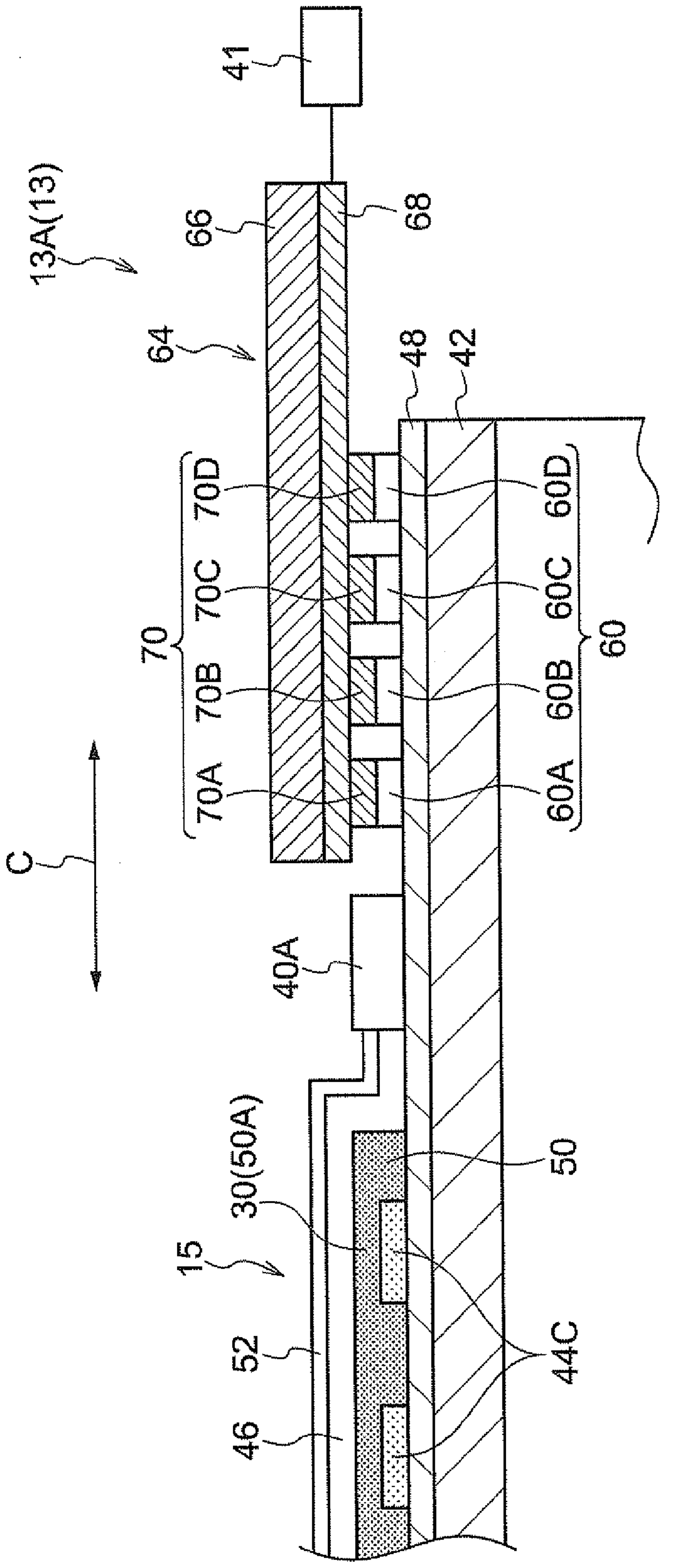
FIG. 8 is an enlarged cross-sectional view schematically illustrating an example of portions of the exposure device and the conductive member of the image forming apparatus according to a third exemplary embodiment and is taken along the line C-C' of FIG. 7.

In each of the plural first lower electrodes 44A, one end opposite to the other end which is connected to the via 44B in the width direction of the support 42 is electrically connected to the driving unit 40B provided on the support 42 (not shown in this exemplary embodiment; see FIG. 4). The driving unit 40B is electrically connected to the control device 41. As shown in FIG. 8, the organic EL layer 50 is provided on the second lower electrodes 44C. Plural upper electrodes 46 are provided on the organic EL layer 50. One end of each of the plural upper electrodes 46 in the width direction of the support 42 is electrically connected to the driving unit 40A provided on the support 42. A surface layer 52 is provided as the outermost layer contacting the image holding member 14 on the outer circumferential surface (in this exemplary embodiment, on the upper electrodes 46) of the exposure device 15.

The exposure device 15 according to this exemplary embodiment is provided with the annular electrodes 60 and the electrodes 61 in addition to the above-mentioned structure (see FIGS. 7 and 8).

As shown in FIGS. 7 and 8, the annular electrodes 60 are provided closer to the end portion of the exposure device 15 in the width direction (in FIG. 7, in the direction of an arrow C) than the position at which the driving unit 40A is provided in the exposure device 15. In addition, the electrodes 60 are arranged in an annular shape along the circumferential direction of the exposure device 15 (support 42), and are arranged such that the surfaces of the annular electrodes 60 are exposed along the circumferential direction of the exposure device 15 (support 42).

The annular electrodes 60 may be provided as long as they are in annular shape in the circumferential direction of the exposure device 15 (support 42) such that the surfaces thereof are exposed along the circumferential direction of the exposure device 15 (support 42). The exposing direction of the annular electrodes 60 may be either the outer circumferential side or the inner circumferential side of the exposure device 15.

In this exemplary embodiment, the case in which the annular electrodes 60 are provided so as to be exposed toward the outer circumferential surface of the exposure device 15 along the circumferential direction of the exposure device 15 is explained.

Specifically, in this exemplary embodiment, the exposure device 15 has a structure in which the insulating layer 48 provided so as to cover the plural first lower electrodes 44A provided on the support 42 is arranged so as to reach and cover the end of the support 42 in the width direction (see the direction of the arrow C in FIG. 8) and the annular electrodes 60 are provided on the insulating layer 48, as shown in FIG. 8. According to this structure, the annular electrodes 60 are arranged such that the surfaces thereof are exposed along the circumferential direction of the exposure device 15 (support 42).

In this exemplary embodiment, plural annular electrodes 60 having an annular shape in the circumferential direction of the support 42 (exposure device 15) are arranged at intervals in the width direction of the support 42 (exposure device 15). In this exemplary embodiment, as shown in FIG. 7, the case in which four annular electrodes 60 (an annular electrode 60A, an annular electrode 60B, an annular electrode 60C, and an annular electrode 60D) are arranged at intervals in the width direction of the support 42 is explained. The number of the annular electrodes 60 may vary depending on the specifications of the driving unit 40A and the driving unit 40B.

Each of the plural annular electrodes 60 (the annular electrode 60A, the annular electrode 60B, the annular electrode 60C, and the annular electrode 60D) is electrically connected to the driving unit 40A through each of the vias 62 (a via 62A, a via 62B, a via 62C, and a via 62D) that are respectively provided in the annular electrodes 60, and by each of the electrodes 61 (an electrode MA, an electrode 61B, an electrode 61C, and an electrode 61D) that are provided so as to correspond to each of the vias 62.

In this exemplary embodiment, the case in which the annular electrode 60A is an electrode electrically connected to a VDS terminal of the driving unit 40A and the annular electrode 60B is an electrode electrically connected to a GND terminal of the driving unit 40A is explained. In addition, in this exemplary embodiment, the case in which the annular electrode 60C is an electrode electrically connected to a data input terminal (DATA terminal) of the driving unit 40A and the annular electrode 60D is an electrode electrically connected to a clock terminal (CLK terminal) of the driving unit 40A is explained.

Next, the conductive member 64 will be described.

The conductive member 64 is fixed to the body of the image forming apparatus 13 by a supporting member (not shown). The conductive member 64 is a member for electrically connecting the driving unit 40A of the exposure device 15 and the control device 41 of the image forming apparatus 13. The conductive member 64 is fixed to the body of the image forming apparatus 13, whereby each of the protruding electrodes 70 (see FIG. 8), which will be described below, provided in the conductive member 64 being provided so as to contact the annular electrodes 60 that are provided at the end of the exposure device 15 in the width direction such that the surfaces thereof are exposed (see FIG. 12).

Figure 11:
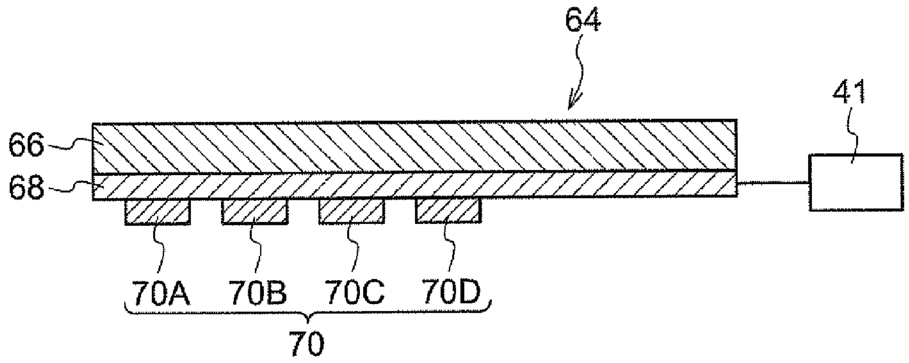
FIG. 11 is a cross-sectional view schematically illustrating an example of the conductive member according to a third exemplary embodiment.

Specifically, as shown in FIGS. 8, 10, and 11, the conductive member 64 includes a plate-shaped supporting member 66. In the following description, expression representing each direction shows a direction exhibited in a state where the conductive member 64 is fixed to the image forming apparatus 13 and the protruding electrodes 70 provided in the conductive member 64 is arranged so as to contact the annular electrodes 60.

Plural strip-shaped electrodes 68 that are elongated in the width direction (the direction of an arrow C in FIG. 8) of the support 42 are arranged on the supporting member 66 (see FIG. 10). The plural electrodes 68 are arranged at intervals in the circumferential direction (in FIGS. 7 and 10, the direction of an arrow B) of the support 42. The number of the plural electrodes 68 corresponds to the number of annular electrodes 60 provided in the exposure device 15. Specifically, in this exemplary embodiment, an electrode 68A, an electrode 68B, an electrode 68C, and an electrode 68D respectively corresponding to the annular electrode 60A, the annular electrode 60B, the annular electrode 60C, and the annular electrode 60D are provided.

The plural electrodes 68 (electrodes 68A to 68D) extend from one end of the supporting member 66 that is located the side far away from the driving unit 40A in the width direction of the support 42 (exposure device 15) to the positions where the electrodes 68 are in one-to-one correspondence with the plural annular electrodes 60 (annular electrodes 60A to 60D) provided in the exposure device 15. Each of the ends of the plural electrodes 68 (electrodes 68A to 68D) extending to the corresponding annular electrodes 60 (annular electrodes 60A to 60D) is electrically connected to each of the corresponding annular electrodes 60 (annular electrodes 60A to 60D) through each of the protruding electrodes (hereinafter, referred to as vias) 70 (vias 70A to 70D), which are conductive portions (see FIGS. 7, 8, and 10). The ends of the plural electrodes 68 (electrodes 68A to 6813) where the vias 70 are not provided are electrically connected to the control device 41 that controls the image forming apparatus 13. The vias 70 (vias 70A to 70D) are provided so as to protrude toward the annular electrodes 60 of the exposure device 15. Therefore, if it is in a state that the conductive member 64 is fixed to the image forming apparatus 13, each of the vias 70 (vias 70A to 70D), which are protruding portions in the conductive member 64, is in one-to-one contact with each of the annular electrodes 60 (annular electrodes 60A to 60D) of the exposure device 15. That is, the vias 70 are electrically connected to the annular electrodes 60.

Therefore, the control device 41 and the driving unit 40A are electrically connected to each other through the electrodes 68 and the vias 70, provided in the conductive member 64 and the annular electrodes 60, the vias 62, and the electrodes 61, provided in the exposure device 15. In this exemplary embodiment, the electrodes 68 and the vias 70, provided in the conductive member 64 are provided so as to be in one-to-one correspondence with each of the plural annular electrodes 60 provided in the exposure device 15. Therefore, a clock signal is transmitted from the control device 41 to the clock terminal of the driving unit 40A through the electrode 68D and the via 70D, in the conductive member 64 and the annular electrode 60D, the via 62D, and the electrode 61D, in the exposure device 15. Data corresponding to image data of the image recorded by the image forming apparatus 13 is transmitted to the data terminal (DATA) of the driving unit 40A through the electrode 68C and the via 70C, in the conductive member 64 and the annular electrode 60C, the via 62C, and the electrode 61C, in the exposure device 15 in synchronization with the clock signal. Similarly, a signal indicating the ground is transmitted from the control device 41 to the GND terminal of the driving unit 40A through the electrode 68B and the via 70B, in the conductive member 64 and the annular electrode 60B, the via 62B, and the electrode 61B, in the exposure device 15. Similarly, a signal indicating VDS is transmitted from the control device 41 to the VDS terminal of the driving unit 40A through the electrode 68A and the via 70A, in the conductive member 64 and the annular electrode 60A, the via 62A, and the electrode 61A, in the exposure device 15.

As described above, the plural annular electrodes 60 are arranged at intervals in the width direction of the exposure device 15 (support 42) and the plural electrodes 68A to 68D of the conductive member 64 are arranged at intervals in the circumferential direction of the exposure device 15 (support 42). Therefore, the plural annular electrodes 60 and the plural electrodes 68A to 68D are arranged so as to intersect each other. It is preferable that the electrodes be arranged so as to be orthogonal to each other.

Next, the operation of the image forming apparatus 13 according to this exemplary embodiment will be described.

Figure 12:
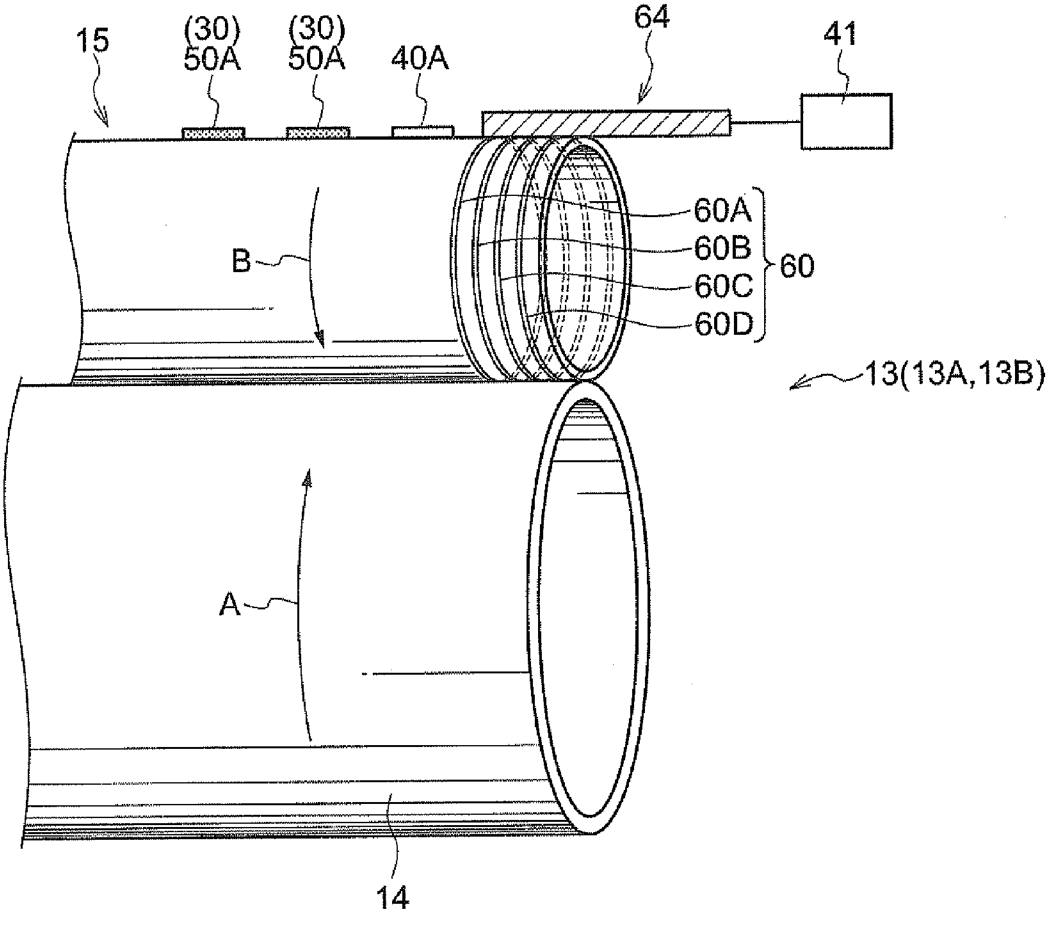
FIG. 12 is a diagram schematically illustrating an example of the positional relationship among an image holding member, the exposure device, and the conductive member of the image forming apparatus according to a third exemplary embodiment.

In the case that the exposure device 15 and the conductive member 64 are configured as shown in FIG. 8, when the image holding member 14 is rotated according to the control by the control device 41, the exposure device 15 which is provided so as to contact with the outer circumferential surface of the image holding member 14 is rotated due to the rotation of the image holding member 14, as shown in FIG. 12.

In this exemplary embodiment, the exposure device 15 is rotated due to the rotation of the image holding member 14; however, since the conductive member 64 is fixed to the main body of the image forming apparatus 13, the conductive member 64 remains fixed without being rotated.

Each of the annular electrodes 60 (annular electrodes 60A to 60D) provided in the exposure device 15 is an annular electrode which is exposed along the circumferential direction of the exposure device 15. Therefore, even when the exposure device 15 is rotated, the electrical connection between each of the electrodes 68 (electrodes 68A to 68D) of the conductive member 64 and each of the annular electrodes 60 (annular electrodes 60A to 60D) through each of the vias 70 (vias 70A to 70D) is maintained. That is, even when the exposure device 15 is rotated, the electrical connection between the control device 41 and the driving unit 40A is maintained since the annular electrodes 60 (annular electrodes 60A to 60D) provided in the exposure device 15 constantly contact the vias 70 (vias 70A to 70D), respectively.

Therefore, even when the exposure device 15 is rotated, a signal for controlling the driving unit 40A is continuously transmitted from the control device 41 without interruption. As a result, it is possible to prevent the interception of the supply of signals or power to each of the plural light emitting members 30. In addition, it is possible to improve the quality of the image formed by the image forming apparatus 13.

In this exemplary embodiment, for simplicity of explanation, the electrical connection relationship between the control device 41 and the driving unit 40A provided in the exposure device 15 has been described. With respect to the driving unit 40B, in the case that the constitution is arranged in the same manner as described above, the interception of the supply of signals or power to each of the plural light emitting members 30 can be suppressed.

Although not shown in the drawings, specifically, plural annular electrodes 60 are also provided on the side of the exposure device 15 close to the driving unit 40B in the width direction. Then, similarly, each of the plural annular electrodes 60 is connected to the driving unit 40B through vias (not shown) and electrodes (not shown). The conductive member 64 having the same structure as described above is arranged and fixed so as to contact each of the annular electrodes 60 that are provided on the side of the exposure device

15 close to the driving unit 40B in the width direction. In this way, the conductive member 64 is electrically connected to the control device 41.

In this exemplary embodiment, as shown in FIG. 8, the case in which the conductive member 64 is arranged such that each of the vias 70 (vias 70A to 70D) of the conductive member 64 directly contacts each of the annular electrodes 60 provided in the exposure device 15 is explained. However, the invention is not limited thereto. The conductive member 64 may have any structure as long as the vias and the annular electrodes can be electrically connected to each other.

Figure 9:
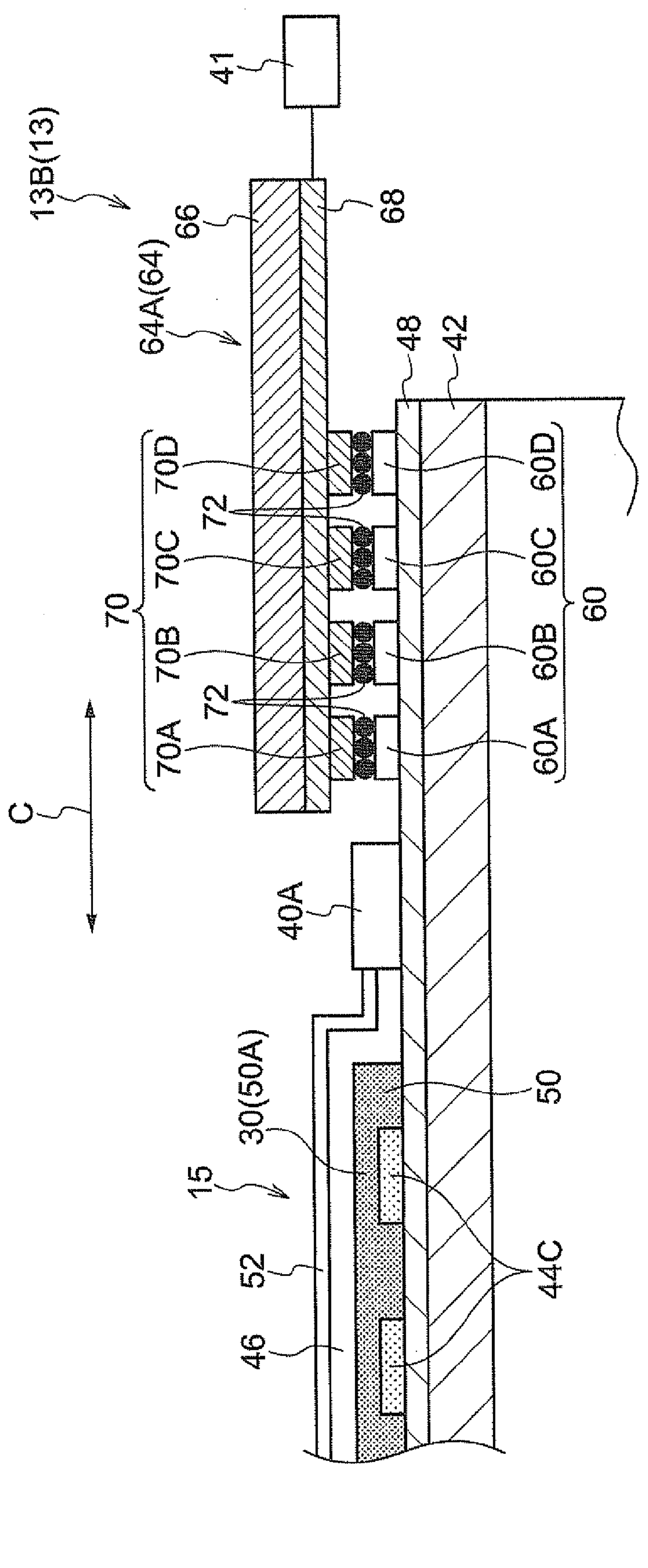
FIG. 9 is an enlarged cross-sectional view schematically illustrating an example of portions of the exposure device and the conductive member of the image forming apparatus according to a third exemplary embodiment and shows a region corresponding to the cross-sectional view taken along the line C-C' of FIG. 7.

For example, as shown in FIG. 9, rotating electrodes 72 may be provided in contact regions with the annular electrodes 60 (annular electrodes 60A to 60D) on the vias 70 (vias 70A to 70D) of the conductive member 64. For example, a spherical electrode or a cylindrical electrode whose rotational direction is aligned so as to correspond with that of the exposure device 15 may be used as the rotating electrode 72.

In the image forming apparatus 13 according to this exemplary embodiment, the case in which the annular electrodes 60 of the exposure device 15 are provided along the circumferential direction of the exposure device 15 so as to be exposed to the outer circumferential side of the surface of the exposure device 15 and the conductive member 64 is provided on the outer circumferential side of the surface of the exposure device 15 is explained. However, the invention is not limited to the above-mentioned positional relationship. An image forming apparatus 17 (see FIG. 13) may be provided in which the annular electrodes 60 of the exposure device 15 are arranged so as to be exposed to the inner circumferential side of the surface of the exposure device 15 and the conductive member 64 is provided on the inner circumferential side of the surface of the exposure device 15.

Figure 13:
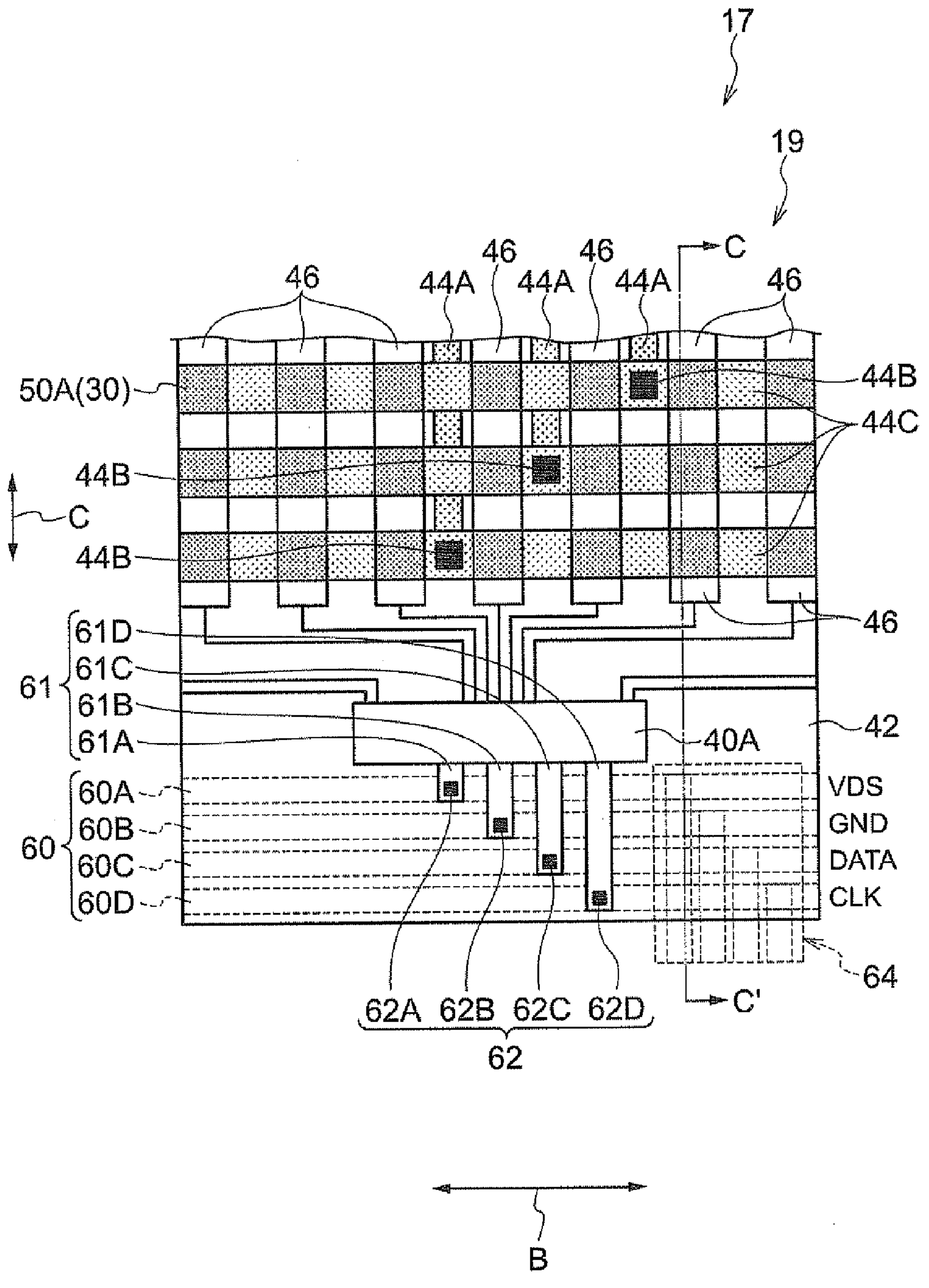
FIG. 13 is an enlarged view schematically illustrating an example of portions of the exposure device and the conductive member of the image forming apparatus according to a third exemplary embodiment.
Figure 14:
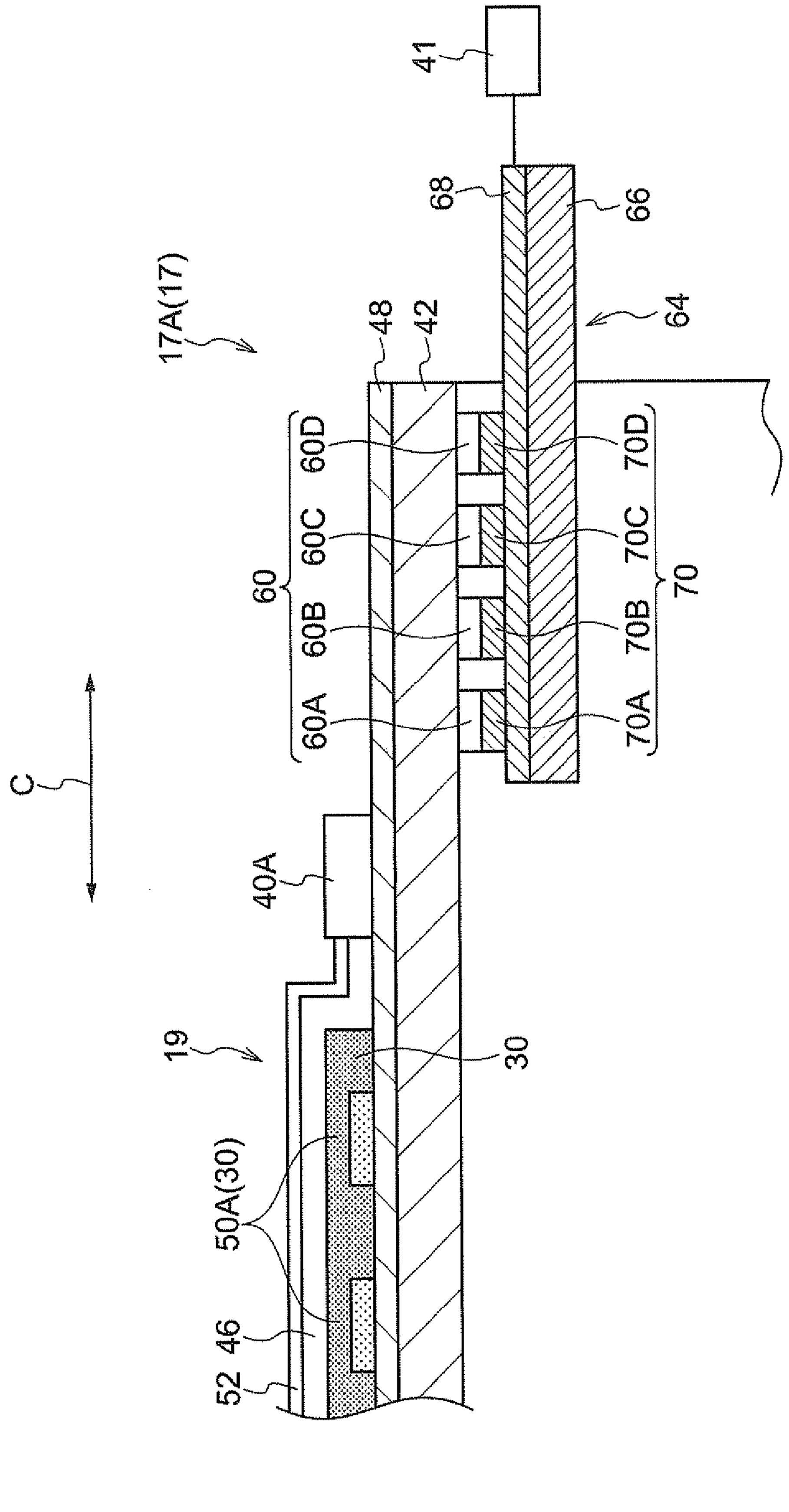
FIG. 14 is an enlarged cross-sectional view schematically illustrating an example of portions of the exposure device and the conductive member of the image forming apparatus according to a third exemplary embodiment and is taken along the line C-C' of FIG. 13.
Figure 16:
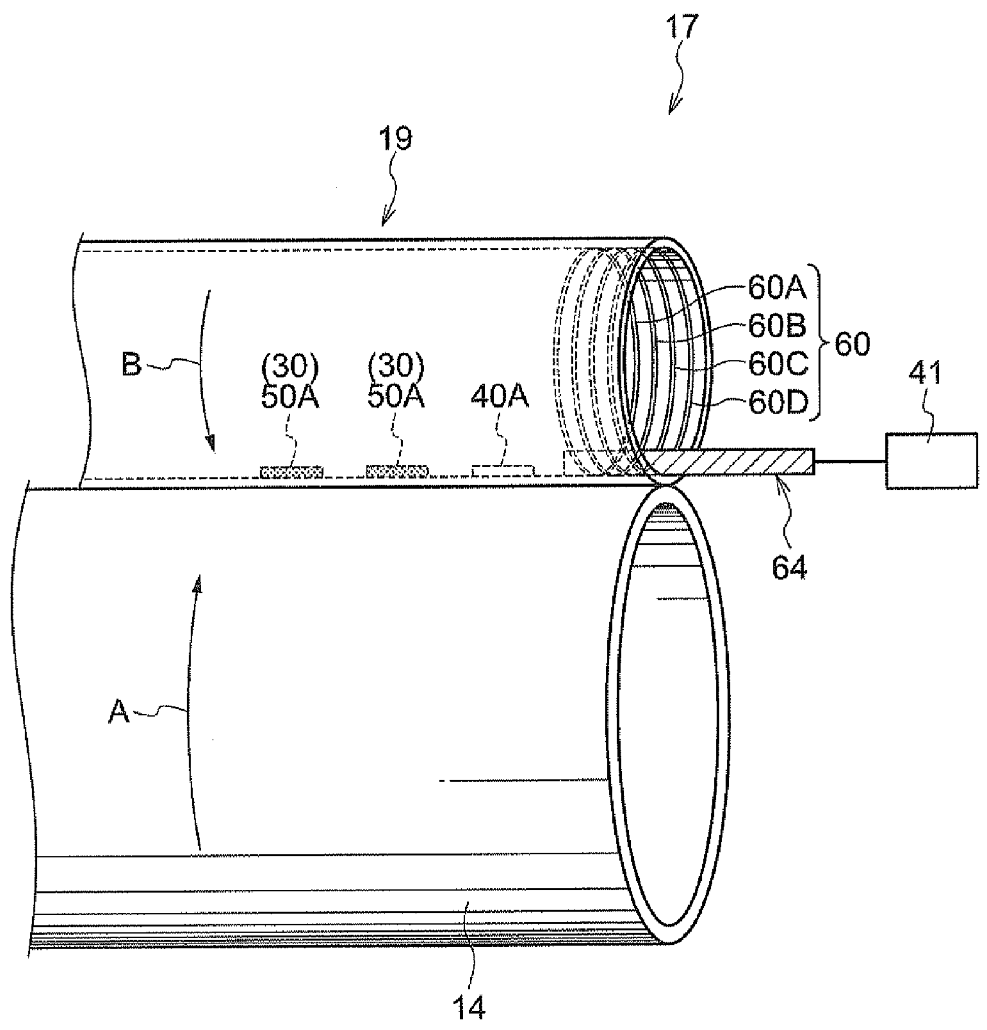
FIG. 16 is a diagram schematically illustrating an example of the positional relationship among the image holding member, the exposure device, and the conductive member of the image forming apparatus according to a third exemplary embodiment.

In this case, specifically, as shown in FIGS. 13, 14, and 16, an exposure device 19 may be provided in which each of the annular electrodes 60 (annular electrodes 60A to 60D) is arranged so as to be exposed to the inner circumferential side of the surface of the support 42 (exposure device 19). The structure of the exposure device 19 is the same as that of the above-mentioned exposure device 15 except that the annular electrodes 60 are arranged along the circumferential direction of the exposure device 19 so as to be exposed to the inner circumferential side of the surface of the exposure device 19 and thus a detailed description thereof will be omitted. In this case, as shown in FIG. 14, the conductive member 64 may be arranged on the inner circumferential side of the surface of the support 42 (exposure device 19) whereby the vias 70 (vias 70A to 70D) of the conductive member 64 contacting each of the annular electrodes 60 (annular electrodes 60A to 60D) exposed to the inner circumferential side of the surface of the exposure device 19.

Figure 15:
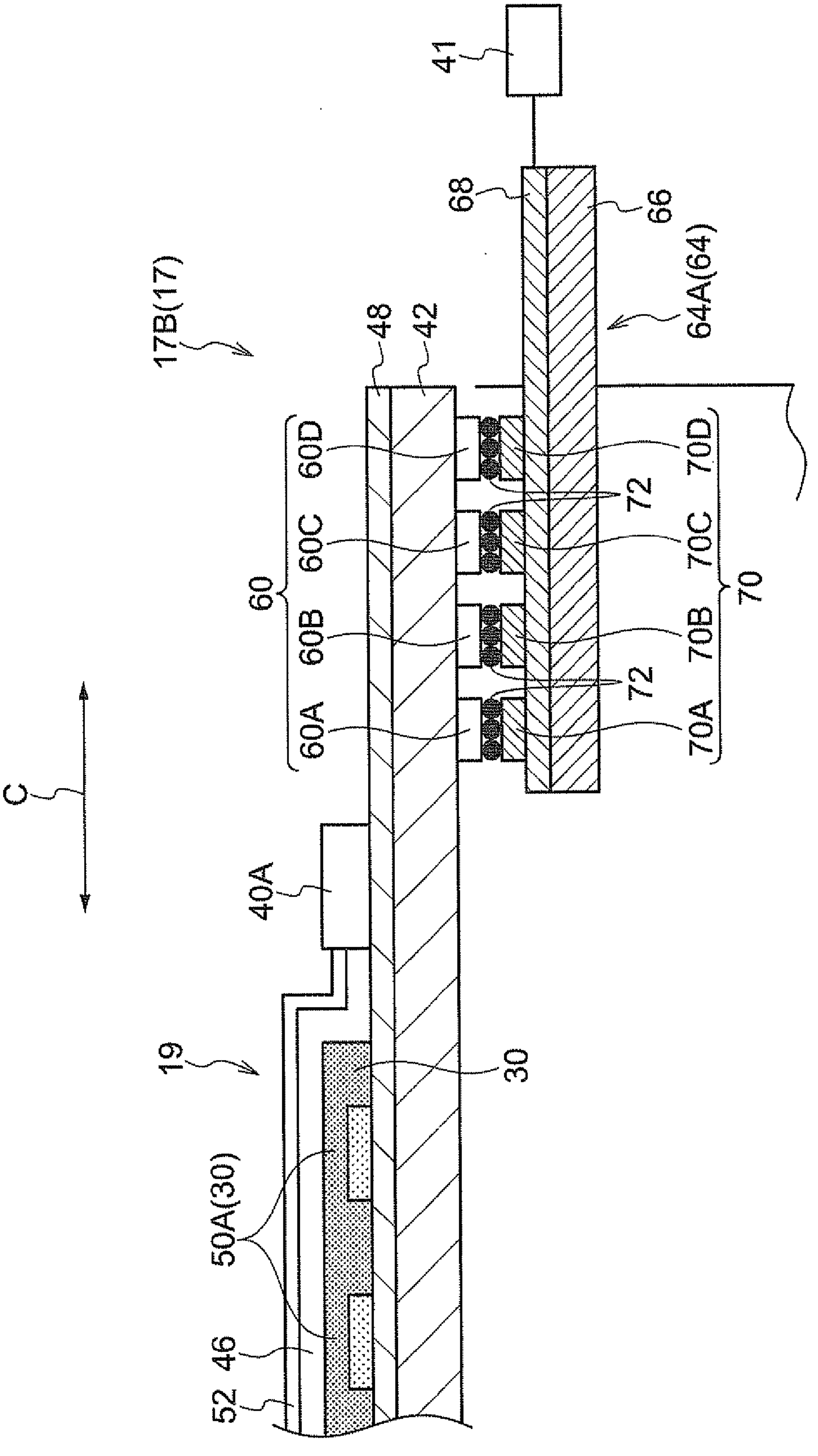
FIG. 15 is an enlarged cross-sectional view schematically illustrating an example of portions of the exposure device and the conductive member of the image forming apparatus according to a third exemplary embodiment and shows a region corresponding to the cross-sectional view taken along the line C-C of FIG. 13.

As described above, in the case in which the conductive member 64 is arranged on the inner circumferential side of the surface of the exposure device 19, the rotating electrodes 72 may be provided in the contact regions with the annular electrodes 60 (annular electrodes 60A to 60D) on the vias 70 (vias 70A to 70D) of the conductive member 64, as shown in FIG. 15.

What is claimed is:

1. An annular exposure device comprising a plurality of light emitting members that are provided two-dimensionally along an outer circumferential surface of the annular exposure device, the annular exposure device rotating when the annular exposure device contacts an outer surface of an image holding member.

2. The annular exposure device according to claim 1, wherein the annular exposure device rotates due to rotation of the image holding member.

3. An image forming apparatus comprising:

the annular exposure device according to claim 1;

a particular image holding member;

a developing device that develops an electrostatic latent image formed on the particular image holding member by the annular exposure device and that forms a toner image; and a transfer device that transfers the toner image on the particular image holding member to a medium to be transferred.

4. The image forming apparatus according to claim 3, wherein the annular exposure device further comprises:

a driving unit that is provided at at least one end portion of the annular exposure device in a width direction and which drives the light emitting members;

a plurality of annular electrodes provided closer to the end of the annular exposure device in the width direction of the annular exposure device than a position in the annular exposure device where the driving unit is provided, and the plurality of annular electrodes being exposed along the circumferential direction of the annular exposure device;

an electrode region that electrically connects the plurality of annular electrodes and the driving unit; and a conductive member that is fixed to a main body of the image forming apparatus, that is arranged such that at least a portion of the conductive member contacts the plurality of annular electrodes, and that electrically connects the plurality of annular electrodes and a control unit that controls the main body of the image forming apparatus.

5. An image forming unit that is attachable to and detachable from an image forming apparatus, the image forming unit comprising:

the annular exposure device according to claim 1; and at least one of a particular image holding member, a charging device that charges the particular image holding member, or a developing device that develops, with a developer, a latent image formed on the particular image holding member.

* * * * *